United States Patent
Asada et al.

(10) Patent No.: US 7,997,255 B2
(45) Date of Patent: Aug. 16, 2011

(54) IGNITION CONTROL APPARATUS AND METHOD FOR CONTROLLING IGNITION OF A FOUR-CYLINDER ENGINE

(75) Inventors: Yukihiro Asada, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 12/288,536

(22) Filed: Oct. 21, 2008

(65) Prior Publication Data

US 2009/0126685 A1    May 21, 2009

(30) Foreign Application Priority Data

Nov. 16, 2007 (JP) ................................ 2007-298059

(51) Int. Cl.
  *F02P 5/00* (2006.01)
  *F02D 41/34* (2006.01)
(52) U.S. Cl. ................ 123/612; 123/406.19; 123/406.2; 123/406.58
(58) Field of Classification Search .................. 123/595, 123/605, 612, 621, 622, 634, 637, 406.11, 123/406.19, 406.2, 406.58, 406.32, 406.33; 701/102, 113, 114, 115
See application file for complete search history.

(56) References Cited

U.S. PATENT DOCUMENTS

| 4,457,286 | A | | 7/1984 | Katayama et al. | |
|---|---|---|---|---|---|
| 4,553,208 | A | * | 11/1985 | Akiyama et al. | 701/105 |
| 4,638,780 | A | * | 1/1987 | Trinh et al. | 123/406.2 |
| 4,649,881 | A | * | 3/1987 | Long | 123/406.63 |
| 4,852,536 | A | * | 8/1989 | Maier et al. | 477/101 |
| 4,889,095 | A | * | 12/1989 | Sogawa | 123/406.47 |
| 5,000,148 | A | * | 3/1991 | Horibe et al. | 477/111 |
| 5,099,811 | A | * | 3/1992 | Frantz et al. | 123/406.62 |
| 5,186,144 | A | * | 2/1993 | Fukui | 123/406.58 |
| 5,433,184 | A | * | 7/1995 | Kinoshita et al. | 123/406.57 |
| 6,591,810 | B2 | * | 7/2003 | Umemoto | 123/406.6 |
| 2004/0011330 | A1 | | 1/2004 | Sauler et al. | |

FOREIGN PATENT DOCUMENTS

JP    3314390    6/2002

* cited by examiner

*Primary Examiner* — Thomas N Moulis
(74) *Attorney, Agent, or Firm* — Carrier Blackman & Associates, P.C.; William D. Blackman; Joseph P. Carrier

(57) ABSTRACT

An engine ignition control apparatus for controlling ignition of a multi-cylinder, 4-cycle engine includes dual ignition coils for controlling ignition timing of the respective cylinders during engine operation. The engine ignition control apparatus includes a stroke determination unit for determining a stroke based on crank pulses and on an output signal of an intake pressure sensor. The engine ignition control apparatus also includes an ignition map allocation unit for allocating ignition maps to the respective cylinders of two ignition systems, each having a pair of cylinders with a same phase, before the stroke determination. The ignition map allocation unit also allocates ignition maps independently to each of the respective cylinders after the stroke determination. The engine ignition control apparatus also includes an ignition timing calculation unit for calculating ignition timing of the respective ignition coils based on the ignition maps allocated to the respective cylinders.

20 Claims, 6 Drawing Sheets

IGNITION CONTROL APPARATUS AND METHOD FOR CONTROLLING IGNITION OF A FOUR-CYLINDER ENGINE

CROSS-REFERENCE TO RELATED APPLICATIONS

The present application claims priority under 35 USC §119 based on Japanese patent application No. 2007-298059, filed on Nov. 16, 2007. The entire subject matter of this priority document is incorporated by reference herein.

BACKGROUND OF THE INVENTION

1. Field of the Invention

The present invention relates to an engine ignition control apparatus and a method for controlling ignition of cylinders of a 4-cycle engine. More particularly, the present invention relates to an ignition control apparatus having fewer ignition coils than a number of cylinders of the engine, for controlling ignition of the cylinders during engine operation.

2. Description of the Background Art

In a four cylinder 4-cycle engine, for example, a first cylinder and a fourth cylinder are mechanically operated at a same phase (e.g., a first phase) and at timings opposite to each other with respect to strokes. In this type of engine, when the first cylinder is at a compression top dead center position, the fourth cylinder is at an exhaust top dead center (TDC) position. In the same manner, the second cylinder and the third cylinder are also operated in coordinated fashion at another phase (e.g., a second phase) and at timings opposite to each other.

An example of a known technique which ignites four cylinders of the 4-cycle engine using two ignition coils, i.e., using fewer ignition coils than number of cylinders, is disclosed in the Japanese patent publication 3314390.

According to the Japanese patent publication 3314390, the first system consisting of the first and fourth cylinders, and the second system consisting of the second and third cylinders respectively share one ignition coil in common. The ignition spark is generated every time one cylinder (of one of the systems) arrives at the TDC ignition timing position for each of the systems. Here, although the other cylinder is also ignited, the other cylinder is at (or may be at) an exhaust top dead center thereof. Hence, when the cylinder is at an exhaust top dead center, such ignition is treated as a "waste" fire.

In order to ignite all four cylinders of the engine efficiently, it is desirable to set the ignition timing for each cylinder. However, in an ignition method which shares a single ignition coil in common for each of the first and second systems as disclosed in the Japanese patent 3314390 publication, two cylinders which belong to the same system (i.e., the first system or the second system) are controlled based on the same ignition map.

Here, a lead angle limit of ignition timing differs for each of the cylinders, and it is necessary to avoid setting of the ignition timing which exceeds the lead angle limit. Accordingly, it is necessary to set the ignition timing for each of the first and the second systems in accordance with a cylinder having the lowest lead angle limit for the system. Hence, it is not possible to sufficiently increase a lead angle of the cylinder which has a higher lead angle limit.

Further, in order to overcome the above-mentioned technical drawback, the preparation of an ignition map for each of the cylinders (e.g., first through fourth ignition maps corresponding to respective one of the first through fourth cylinders) is considered. However, in such a case in which the ignition timing is prepared for each of the cylinders, it is impossible to discriminate whether the top dead center is a compression top dead center or an exhaust top dead center until a stroke determination is completed, even when each cylinder arrives at a top dead center thereof. Accordingly, cylinders which belong to the same system are ignited at the same ignition timing which conforms to the cylinder having the low lead angle limit, and the respective cylinders are ignited at independent ignition timings after the stroke determination.

For example, when the lead angle limit of the fourth ignition map is higher than the lead angle limit of the first ignition map, until the stroke determination is completed, both of the first and fourth cylinders are ignited at the ignition timing of the first ignition map, and after the stroke determination, the first cylinder is succeedingly ignited at the ignition timing of the first ignition map and the ignition timing of the fourth cylinder is changed over to the ignition timing of the fourth ignition map. However, this control method which changes over the ignition map before and after the stroke determination has following technical drawbacks.

In other words, to explain the technical drawbacks by focusing on the second and third cylinders which belong to the second system, between a point of time that the timing of system ignition is calculated at a predetermined calculation stage and a point of time that the ignition is actually performed at the ignition timing, it is necessary to ensure a time and the like in which electricity is supplied to the ignition coil and the ignition energy is stored. Accordingly, there may be a situation in that the stroke determination is completed after calculating the ignition timing of the system ignition and before ignition at the ignition timing.

On the other hand, a timer for measuring the ignition timing is provided on a one-timer-for-one-ignition-coil basis. Hence, when an independent ignition control is started immediately after the completion of the stroke determination, for example, the third cylinder arrives at the calculation stage immediately after the stroke determination, and the ignition timing is calculated based on the third ignition map, there may be a situation in which a predetermined value of the ignition timer is rewritten to the ignition timing of the third cylinder in independent ignition from the ignition timing of the second system ignition.

Accordingly, there has been a technical drawback that when the ignition timing of the second cylinder comes earlier than the ignition timing of the third cylinder, the second cylinder is ignited at the ignition timing calculated based on the third ignition map.

The present invention has been made to overcome such drawbacks of the existing ignition control apparatus. Accordingly, it is a first object of the present invention to provide an engine ignition control apparatus which can independently control ignition timings of different cylinders, by providing ignition maps dedicated to respective cylinders using only two ignition coils in a four cylinder 4-cycle engine.

Also, it is a second object of the present invention to provide an engine ignition control apparatus which can prevent an erroneous ignition of a cylinder based on an ignition map of another cylinder, even when the ignition is changed over from the system ignition based on two ignition maps to the independent ignition based on four ignition maps before and after the stroke determination using only two ignition coils in a four cylinder 4-cycle engine.

SUMMARY OF THE INVENTION

In order to achieve the above-mentioned objects, the present invention provides an engine ignition control apparatus, which ignites four cylinders of a 4-cycle engine using two ignition coils, having the following characteristics.

(1) An engine ignition control apparatus is characterized to include first to fourth ignition maps which are associated with respective cylinders, first and second ignition coils provided for respective systems, wherein two of the four cylinders having a same phase belong to one system and the other two cylinders having another same phase belong to another system, a stroke determination unit which determines strokes of the respective cylinders, an ignition map allocation unit which allocates an ignition map for every system before the stroke determination and allocates the ignition map for every cylinder after the stroke determination, and an ignition timing calculation unit which calculates ignition timings of the respective cylinders based on the ignition maps allocated to the cylinders.

(2) Further, the engine ignition control apparatus is characterized in that when the stroke determination is completed before the ignition based on the ignition map allocated to each of the systems before the stroke determination is completed, until the ignition based on the ignition map is completed, the ignition map is not independently allocated to the respective cylinders of the system.

ADVANTAGES OF THE INVENTION

According to the present invention, it is possible to acquire following advantageous effects.

Firstly, in the four cylinder 4-cycle engine, before the stroke determination, the system ignition using two ignition coils and two ignition maps can be executed, while after the stroke determination, the system ignition can be changed over to the independent ignition using two ignition coils and four ignition maps.

Secondly, when the system ignition is executed at the time of stroke determination, the independent ignition is started only after the completion of the system ignition. Accordingly, it is possible to prevent the independent ignition from being executed based on the ignition condition set in the system ignition.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
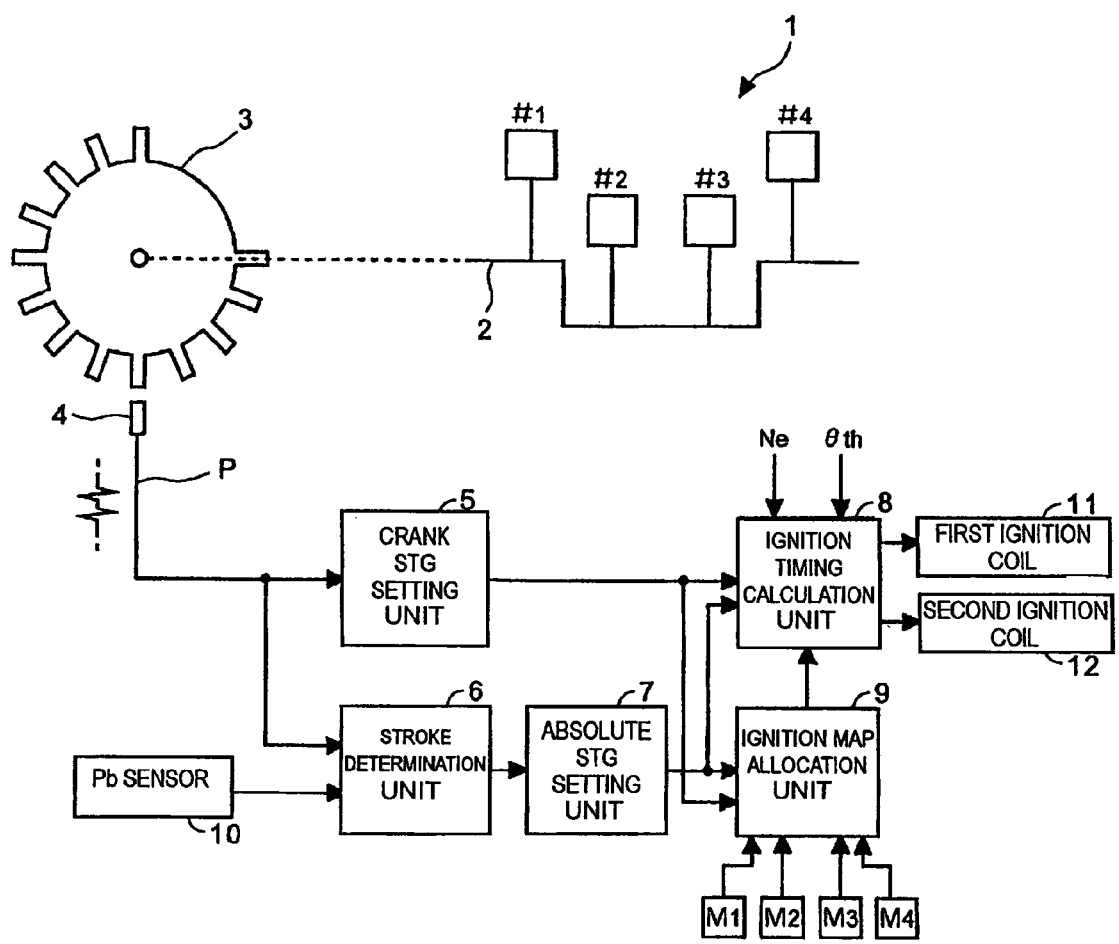
FIG. 1 is a functional block diagram showing the constitution of main units of an engine ignition control apparatus according to the present invention.

Hereinafter, the best mode for carrying out the present invention is explained in detail in conjunction with drawings. FIG. 1 is a simplified block diagram showing the main units of an engine ignition control apparatus according to the present invention. Here, an illustrative mode for carrying out the present invention is explained for a 4-cycle 4-cylinder engine, as an example.

A crankshaft 2 of an engine 1 is provided with a crank pulser rotor 3, and a pulse generator 4 which outputs thirteen crank pulses P including a non-tooth portion for every rotation of the crank pulser rotor 3. In the engine 1 of this embodiment, first and fourth cylinders (#1, #4) belong to a first system having the same phase, and have strokes opposite to each other. Further, second and third cylinders (#2, #3) belong to a second system where the second and third cylinders have the same phase and have strokes opposite to each other.

A crank STG setting unit 5 sets a crank stage (crank STG) based on the crank pulses P, before stroke determination, in which one rotation (360°) of the crankshaft 2 defines one cycle of engine operation. A stroke determination unit 6 determines the stroke based on the crank pulses P and an output signal from a Pb (intake pressure) sensor 10.

Here, a method of determining a stroke based on the crank pulses P and the intake pressure Pb is disclosed in Japanese patent application (JP-A-2007-56732) filed by the applicant of this application. The entire disclosure of JP-A-2007-56732 is incorporated by reference herein. Hence, such method of determining a stroke is not separately explained herein.

An absolute STG setting unit 7 sets an absolute stage (absolute STG) based on the crank pulses P after the stroke determination, in which two rotations (720°) of the crankshaft 2 defines one cycle of engine operation. In each of a first, second, third and fourth ignition map M1, M2, M3, M4, ignition information intrinsic to the respective cylinders, timings for starting the supply of electricity to first and second ignition coils 11, 12 or the ignition timings are registered in table form, using parameters such as a rotary engine speed Ne, a throttle opening θth and the like.

The ignition map allocation unit 9 allocates the respective ignition maps for each system based on the crank STG before the stroke determination, and allocates the respective ignition maps for each cylinder based on the absolute STG after the stroke determination.

In the ignition control system of this illustrative embodiment, before the stroke determination, the first ignition map M1 is allocated to the first system, and the second ignition map M2 is allocated to the second system. An ignition timing calculation unit 8 calculates the ignition timing or the electricity supply start timing for the respective ignition coils 11, 12 based on the ignition maps allocated to the respective systems.

Figure 2:
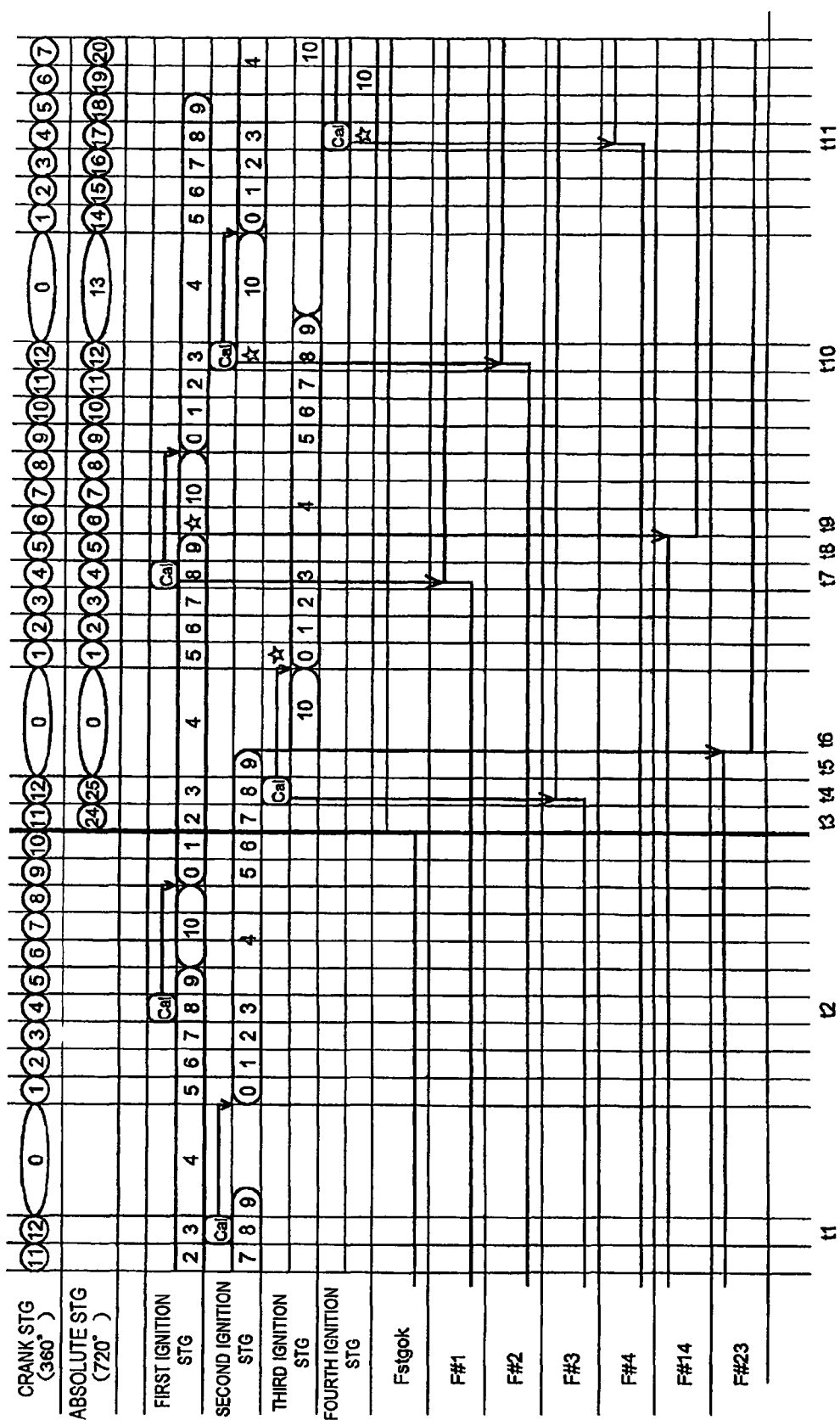
FIG. 2 is a timing chart (first portion) for explaining the manner of operation of an illustrative embodiment of the present invention.
Figure 3:
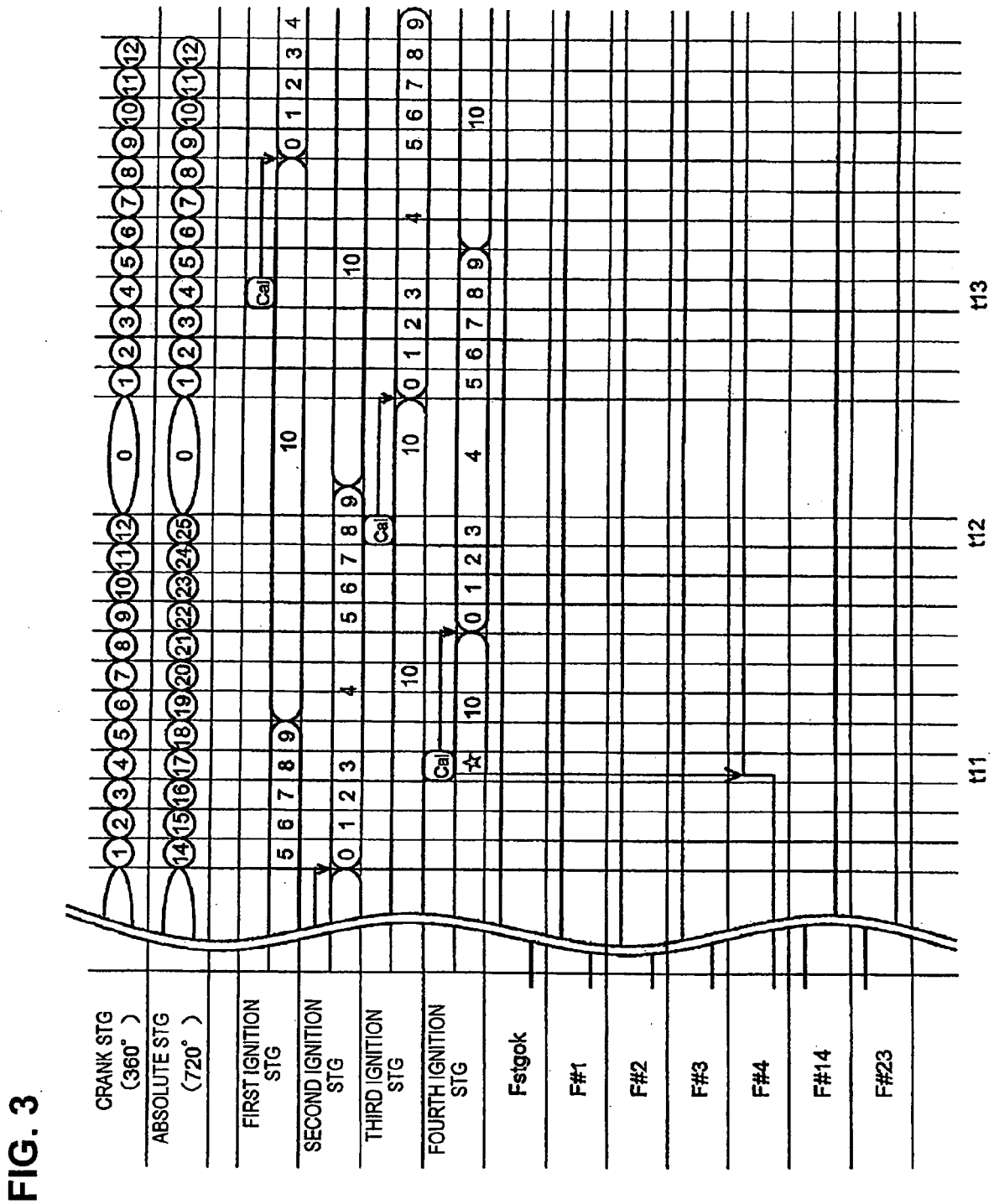
FIG. 3 is a timing chart (second portion) for explaining the manner of operation of the illustrative embodiment of the present invention.

FIGS. 2 and 3 are timing charts (first portion, second portion) for explaining the manner of operation of an illustrative embodiment of the present invention. In FIGS. 2 and 3, until a point of time t3 at which the stroke determination is completed, one rotation (360°) of the crankshaft 2 is divided into 13 crank STGs consisting of 0th to 12th crank STGs, and after completion of the stroke determination, two rotations (720°) of the crankshaft 2 are divided into 26 absolute stages consisting of 0th to 25th absolute stages.

Further, apart from the above-mentioned stages, a plurality of ignition stages is dedicated to an ignition control for each of respective cylinders. The plurality of ignition stages include a first ignition STG, a second ignition STG, a third ignition STG, and a fourth ignition STG corresponding to the first cylinder, the second cylinder, the third cylinder and the fourth cylinder, respectively.

In any one of these first through fourth ignition STGs, the 8th stage is a calculation stage (Cal) for determining the ignition timing or electricity supply start timing by reference to the ignition map, the stages ranging from the 0th stage to the 9th stage fall within an ignition-coil chargeable range, the stages from the 5th stage to the 9th stage fall within an ignition enable range, and the 10th stage is a standby stage.

Further, in this embodiment, with respect to the first and fourth cylinders of the first system, a maximum lead angle in the fourth ignition map M4 for the fourth cylinder is set larger than a maximum lead angle in the first ignition map M1 for the first cylinder. Accordingly, before the stroke determination, the ignition timings or the like of both of the first and fourth cylinders are determined based on the first ignition map M1 of the first cylinder.

Similarly, with respect to the second and third cylinders of the second system, a maximum lead angle in the third ignition map M3 for the third cylinder is set larger than a maximum lead angle in the second ignition map M2 for the second cylinder. Accordingly, before the stroke determination, the ignition timings or the like of both of the second and third cylinders are determined based on the second ignition map M2 for the second cylinder.

Further, in this embodiment, the following flags are prepared. A stroke determination flag Fstgok is in a reset state before the stroke determination, and is in a set state after the completion of the stroke determination. The first cylinder flag F#1 is reset during the system ignition before the stroke determination, and is set when the first cylinder arrives at the calculation stage cal after the stroke determination. In the same manner, the second, third and fourth cylinder flags F#2, F#3 and F#4 are reset during the system ignition before the stroke determination, and are set when the second, third and fourth cylinders arrive at the calculation stage after the stroke determination.

The first system flag F#14 is in a set state before the stroke determination, and the first cylinder or the fourth cylinder arrives at the calculation stage after the stroke determination and, thereafter, the first system flag F#14 is reset at a point of time that the system ignition STG of the first system completes a final stage. The second system flag F#23 is in a set state before the stroke determination, and the second cylinder or the third cylinder arrives at the calculation stage after the stroke determination and, thereafter, the second system flag F#23 is reset at a point of time that the system ignition STG of the second system completes a final stage.

Figure 4:
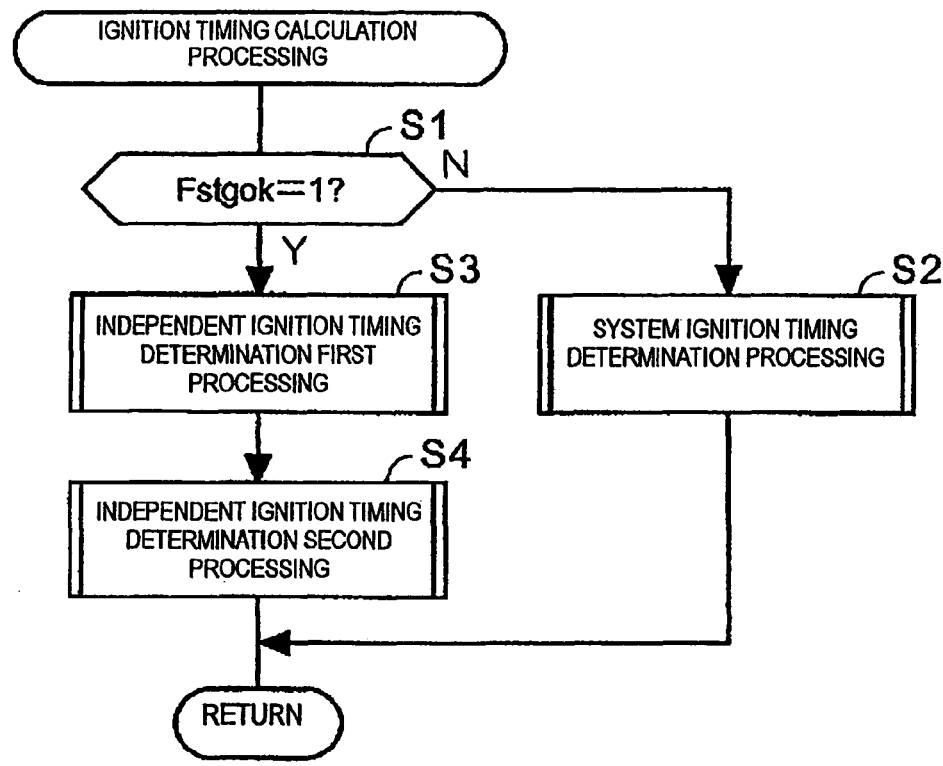
FIG. 4 is a main flowchart showing a manner of operation (ignition timing calculation processing) of the illustrative embodiment.
Figure 5:
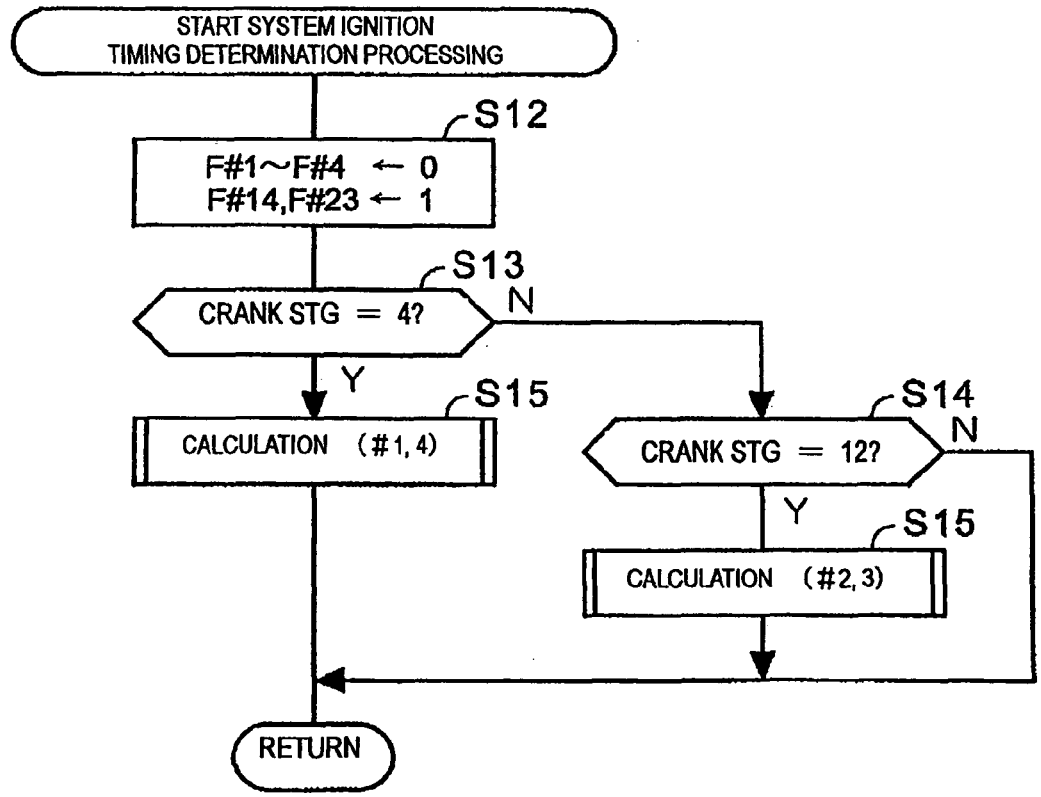
FIG. 5 is a flowchart of a system ignition timing determination processing.
Figure 6:
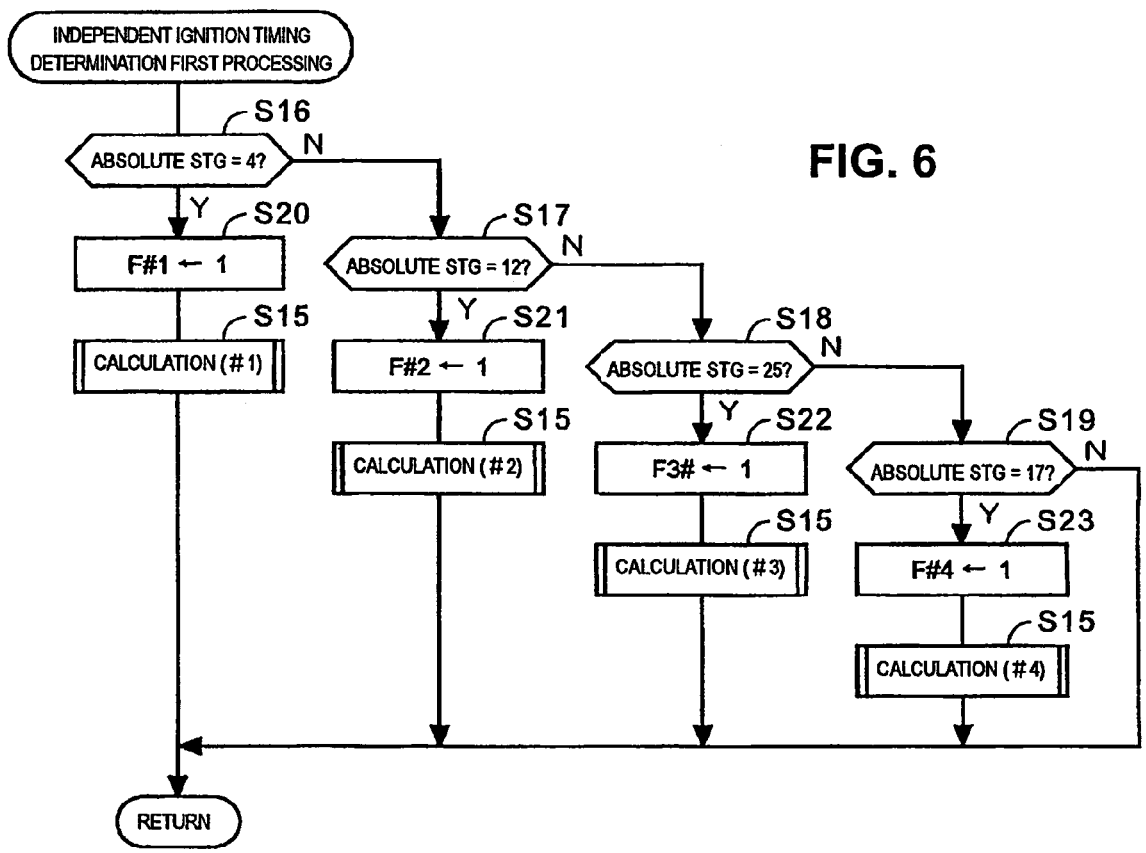
FIG. 6 is a flowchart of an independent ignition timing determination for the first processing.
Figure 7:
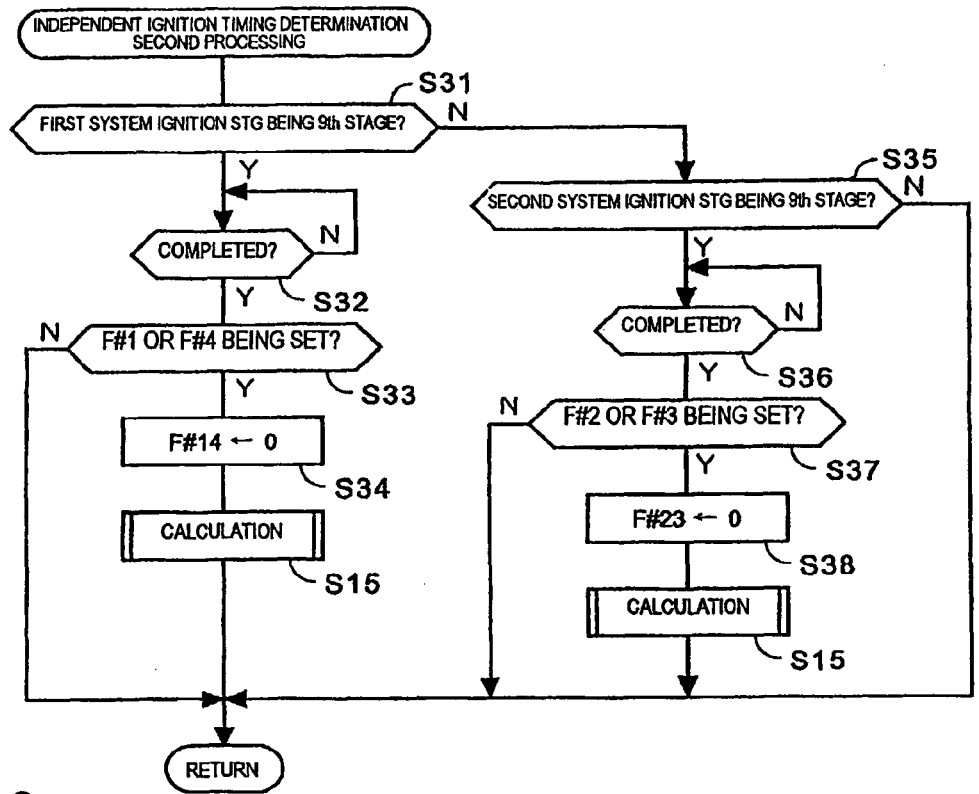
FIG. 7 is a flowchart of an independent ignition timing determination for the second processing.
Figure 8:
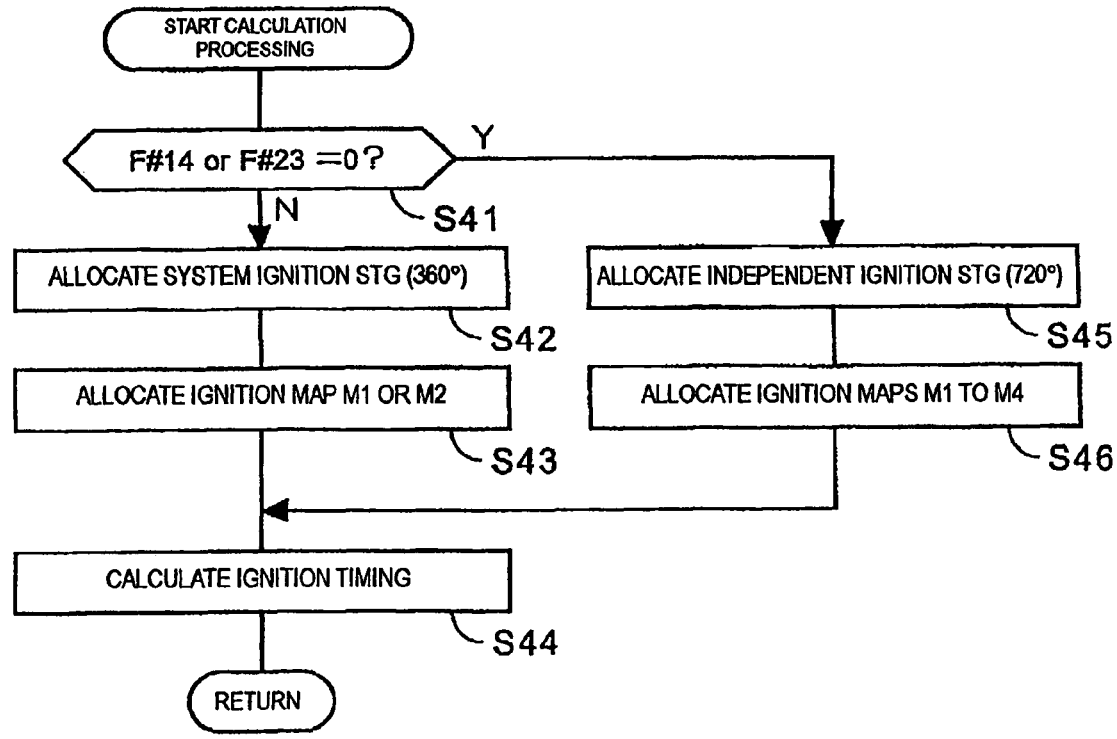
FIG. 8 is a flowchart of the calculation processing.

FIG. 4 is a main flowchart showing the manner of operation of this embodiment. FIG. 5, FIG. 6 and FIG. 7 are flowcharts respectively showing the respective steps of "system ignition timing determination processing (S2)", "independent ignition timing determination first processing (S3)" and "independent ignition timing determination second processing (S4)" in the main flowchart, shown in FIG. 4. FIG. 8 is a flowchart showing steps of "calculation processing" executed in the respective determination processing, shown in each of the FIGS. 5, 6 and 7.

In FIG. 4, the stroke determination flag Fstgok is referenced in step S1. When initially the stroke determination is not completed, the stroke determination flag Fstgok is in a reset state. Accordingly, the processing advances to step S2. In step S2, "system ignition timing determination processing", the ignition timings of the respective cylinders are determined for each of the first and second systems before the stroke determination is executed.

FIG. 5 is a flowchart showing further steps for executing the above-mentioned step 2, i.e., "system ignition timing determination processing", shown in FIG. 4. In step S12, four cylinder flags F#1, F#2, F#3, F#4 provided for respective cylinders are reset, and two system flags F#14, F#23 provided for respective systems are set.

In steps S13 and S14, the crank STG is referenced. When the crank STG is "4" at a point of time t2 in FIG. 2, it is determined that the crank STG is in the calculation stage of the first system (first and fourth cylinders), and the processing advances to step S15 for calculating the ignition timings of the first and fourth cylinders. Further, when the crank STG is "12" at a point of time t1 in FIG. 2, it is determined that the crank STG is in the calculation stage for the second system (having the second and third cylinders), and the processing advances to calculation processing in step S15 for calculating the ignition timings of the second and third cylinders.

FIG. 8 is a flowchart showing steps of calculation processing executed in step S15 (of FIG. 5), and mainly shows the manner of operation of the ignition timing calculation unit 8.

As shown in FIG. 8, in step S41, either one of the first and second system flags F#14, F#23 is referenced based on the current crank STG. Here, when the crank STG is "12" at a point of time t1 in FIG. 2, the second system flag F#23 is referenced to determine whether or not the ignition control of the second and third cylinders is to be changed over to the independent ignition from the system ignition.

Here, since the second system flag F#23 is in a set state, the processing advances to step S42 (FIG. 8) for continuing the system ignition. In step S42, 360° of the crankshaft 2 defines 1 cycle, and the system ignition STG in which the 8th stage (calculation stage) and the 12th stage of the crank STG are synchronized is allocated as the second ignition STG representing the second system. In step S43 (FIG. 8), the second ignition map M2 for the second cylinder is allocated to the second system.

On the other hand, when the crank STG is "4" at a point of time t2, the first system flag F#14 is referenced in the above-mentioned step S41 (FIG. 8) to determine whether or not the ignition control of the first and fourth cylinders is to be changed over to the independent ignition from the system ignition.

Here, since the first system flag F#14 is in a set state, the processing advances to step S42 (FIG. 8) for continuing the system ignition. In step S42, 360° of the crankshaft 2 defines 1 cycle, and the system ignition STG in which the 8th stage (calculation stage) and the 4th stage of the crank STG are synchronized is allocated as the first ignition STG representing the first system. In step S43, the first ignition map M1 for the first cylinder is allocated to the first system. In step S44, the ignition timings intrinsic to the respective systems are calculated based on the allocated ignition stages and ignition maps.

Thereafter, when the stroke determination by the stroke determination unit 6 is completed at a point of time t3 in FIG. 2, the absolute stage (absolute STG) which sets 2 cycles of the crank STG to 1 cycle is newly set by the absolute STG setting unit 7 and, at the same time, the stroke determination flag Fstgok is set. Then, when the setting of the stroke determination flag Fstgok is detected in step S1 in FIG. 4, the processing advances to step S3 where "independent ignition timing determination first processing" is executed.

FIG. 6 is a flowchart showing for executing the above-mentioned step 3, i.e., "independent ignition timing determination first processing". Here, the ignition stage and the ignition map are allocated to the cylinder which arrives at the ignition stage by the above-mentioned ignition map allocation unit 9.

In steps S16, S17, S18 and S19 (FIG. 6), it is determined whether or not the current absolute STG is any one of "4", "12", "25", and "17". In other words, it is determined whether or not any one of cylinders arrives at the calculation stage of the independent ignition.

Referring to FIG. 6, when the absolute STG is "4", it is determined that the first cylinder arrives at the calculation stage and the processing advances to step S20 and the first cylinder flag F#1 is set. In the same manner, when the absolute STG is "12", it is determined that the second cylinder arrives at the calculation stage and the processing advances to step S21 and the second cylinder flag F#2 is set. When the absolute STG is "25", it is determined that the third cylinder arrives at the calculation stage and the processing advances to step S22 and the third cylinder flag F#3 is set. When the absolute STG is "17", it is determined that the fourth cylinder arrives at the calculation stage and the processing advances to step S23 and the fourth cylinder flag F#4 is set. In step S15, the ignition timing is calculated, as further illustrated in FIG. 8.

In order to explain the processing in conjunction with FIG. 2, when the absolute STG arrives at "25" at a point of time t4 after the stroke determination, this arrival of the absolute STG is detected in step S18 in FIG. 6, the third cylinder flag F#3 is set in step S22 and, thereafter, the processing advances to step S15 for calculating the ignition timing of the third cylinder. The calculation processing, i.e., step S15, is executed as shown in FIG. 8.

Further, in order to explain the processing in conjunction with FIG. 8, in step S41, the second system flag F#23 is referenced to make the determination for setting the third cylinder to either one of the system ignition and the independent ignition. Here, since the second system flag F#23 is still in a set state, the processing advances to step S42 for continuing the system ignition. In step S42, the system ignition STG (second) is allocated to the second ignition STG representing the second system. In step S43, the second ignition map M2 for the second cylinder is allocated to the second system.

In step S44, based on the system ignition STG and the second ignition map M2, the system ignition timing shared in common by the second and third cylinders is calculated. In other words, in this embodiment, even after the stroke determination, provided that the second system flag F#23 is in a set state, the system ignition is continued with respect to the second system.

Returning to the flowchart shown in FIG. 4, step S4, i.e., "independent ignition timing determination second processing, which follows the above-mentioned step S3, is executed.

FIG. 7 is a flowchart showing further steps for executing the above-mentioned step 4, "independent ignition timing determination second processing". Here, the independent ignition STG is allocated to the cylinder which completes the final stage (9th stage) of the system ignition STG after the stroke determination under predetermined conditions.

In steps S31 and S35, it is determined whether or not the first system and the second system ignition STGs are respectively in the final stage (here, 9th stage). When the system ignition STG of the second system arrives at the final stage at a point of time t5 in FIG. 2, and this arrival of the system ignition STG is detected in step S35, the processing advances to step S36. When the final stage is completed at a point of time t6 and the completion of the final stage is detected in step S36, it is determined that the ignition at the system ignition timing calculated before the stroke determination is completed, and the processing advances to step S37.

In step S37, it is determined whether or not at least one of the second and third cylinder flags F#2, F#3 is set. Here, since the third cylinder flag F#3 is already set at a point of time t4, the processing advances to step S38 and the second system flag F#23 is reset. In step S15, the above-mentioned calculation processing in FIG. 8 is newly executed.

In order to explain the processing in conjunction with FIG. 8, in step S41, out of the first and second system flags F#14, F#23, the second system flag F#23 corresponding to the system ignition STG which completes the final stage is referenced. Here, since the second system flag F#23 is in a reset state, the processing advances to step S45 for adopting the independent ignition.

In step S45 (FIG. 8), 720° defines one cycle, and the independent ignition STG (second) whose a calculation stage is associated with the 12th stage of the absolute STG is allocated as the ignition stage of the second cylinder. In step S46, the second ignition map M2 is allocated to the second cylinder.

Thereafter, when the absolute STG arrives at "4" at a point of time t7 in FIG. 2, this arrival of the absolute STG is detected in step S16 (FIG. 6), the first cylinder flag F#1 is set in step S20. Thereafter, the processing advances to step S15 for calculating the ignition timing of the first cylinder. In step S15, the calculation processing explained in conjunction with FIG. 8 is executed again.

In order to explain the calculation processing in conjunction with FIG. 8, in step S41, the first system flag F#14 is referenced to make the determination for setting the first cylinder to either one of the system ignition and the independent ignition. Here, since the first system flag F#14 is still in a set state, the processing advances to step S42 for continuing the system ignition. In step S42, the system ignition STG (first) is allocated to the first ignition STG representing the first system.

In step S43 (FIG. 8), the first ignition map M1 for the first cylinder is allocated to the first system. In step S44, based on the system ignition STG and the first ignition map M1, the ignition timing shared in common by the first and fourth cylinders is determined. In other words, even after the stroke determination, provided that the first system flag F#14 is in a set state, the system ignition is continued with respect to the first system.

Thereafter, when the system ignition STG of the first system arrives at the final stage at a point of time t8 in FIG. 2 and this arrival of the system ignition STG is detected in step S31 in FIG. 7, the processing advances to step S32. When the final stage is completed at a point of time t9 and the completion of the final stage is detected in step S32, it is determined that the ignition at the system ignition timing calculated before the stroke determination is completed, and the processing advances to step S33.

In step S33, it is determined whether or not at least one of the first cylinder and fourth cylinder flags F#1, F#4 is set. Here, since the first cylinder flag F#1 is already set at a point of time t7, the processing advances to step S34 and the first system flag F#14 is reset. In step S15, the above-mentioned calculation processing in FIG. 8 is again executed.

In order to explain the processing in conjunction with FIG. 8, in step S41, out of the first and second system flags F#14, F#23, the first system flag F#14 corresponding to the system ignition STG which completes the final stage is referenced. Here, since the first system flag F#14 is in a reset state, the processing advances to step S45 for adopting the independent ignition. In step S45, 720° defines one cycle, and the independent ignition STG (first) whose a calculation stage is associated with the 4th stage of the absolute STG is allocated as the ignition stage of the first cylinder. In step S46, the first ignition map M1 is allocated to the first cylinder.

Thereafter, when the absolute STG arrives at "12" at a point of time t10 in FIG. 2, this arrival of the absolute STG is detected in step S17 in FIG. 6, the second cylinder flag F#2 is set in step S21 and, thereafter, the processing advances to step S15 for calculating the ignition timing of the second cylinder. In step S15, the calculation processing explained in conjunction with FIG. 8 is executed again.

In order to explain the processing in conjunction with FIG. 8, in step S41, the second system flag F#23 is referenced to make the determination for setting the second cylinder to either one of the system ignition and the independent ignition. Here, since it is determined that the second system flag F#23 is in a reset state, the processing advances to step S45 for adopting the independent ignition. In step S45, a 720° defines one cycle, and the independent ignition STG (second) whose calculation stage is associated with the 12th stage of the absolute STG is allocated as the ignition stage of the second cylinder. In step S46, the second ignition map M2 is allocated to the second cylinder.

In the same manner, when the absolute STG arrives at "17" at a point of time t11 in FIG. 2, this arrival of the absolute STG is detected in step S19 in FIG. 6, the fourth cylinder flag F#4 is set in step S23. Thereafter, the processing advances to step S15 for calculating the ignition timing of the fourth cylinder. In step S15, the calculation processing, explained in conjunction with FIG. 8, is executed again.

In order to explain the processing in conjunction with FIG. 8, in step S41, the first system flag F#14 is referenced to make the determination for setting the fourth cylinder to either one of the system ignition and the independent ignition. Here, since it is determined that the first system flag F#14 is in a reset state, the processing advances to step S45 for adopting the independent ignition.

In step S45, 720° defines one cycle, and the independent ignition STG (fourth) whose a calculation stage is associated with the 17th stage of the absolute STG is allocated as the ignition stage of the fourth cylinder. In step S46, the fourth ignition map M4 is allocated to the fourth cylinder.

Thereafter, when the absolute STG arrives at "25" at a point of time t12 in FIG. 3, this arrival of the absolute STG is detected in step S18 in FIG. 6, the third cylinder flag F#3 is set in step S22. Thereafter, the processing advances to step S15 for calculating the ignition timing of the third cylinder. In step S15, the calculation processing explained in conjunction with FIG. 8 is executed again.

In order to explain the processing in conjunction with FIG. 8, in step S41, the second system flag F#23 is referenced to make the determination for setting the third cylinder to either one of the system ignition and the independent ignition. Here, since it is determined that the third system flag F#23 is in a reset state, the processing advances to step S45 for adopting the independent ignition. In step S45, 720° defines one cycle, and the independent ignition STG (third) whose calculation stage is associated with the 25th stage of the absolute STG is allocated as the ignition stage of the third cylinder. In step S46, the third ignition map M3 is allocated to the third cylinder.

Further, when the absolute STG arrives at "4" at a point of time t13 in FIG. 3, this arrival of the absolute STG is detected in step S16 in FIG. 6, the first cylinder flag F#1 is set in step S20. Thereafter, the processing advances to step S15 for calculating the ignition timing of the first cylinder. In step S15, the calculation processing explained in conjunction with FIG. 8 is executed again.

In order to explain the processing in conjunction with FIG. 8, in step S41, the first system flag F#14 is referenced to make the determination for setting the first cylinder to either one of the system ignition and the independent ignition. Here, since it is determined that the first system flag F#14 is in a reset state, the processing advances to step S45 for adopting the independent ignition.

In step S45, 720° defines one cycle, and the independent ignition STG (first) whose calculation stage is associated with the 4th stage of the absolute STG is allocated as the ignition stage of the first cylinder. In step S46, the first ignition map M1 is allocated to the first cylinder.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An engine ignition control apparatus for controlling ignition in cylinders of a 4-cycle four cylinder engine using a pair ignition coils, wherein two of the four cylinders having a same phase belong to a first system, and a remaining two cylinders having another same phase belong to a second system, said engine ignition control apparatus comprising:
a plurality of ignition maps comprising a first ignition map, a second ignition map, a third ignition map and a fourth ignition map; each of said ignition maps being associated with a respective one of said four cylinders;
said pair of ignition coils comprising a first ignition coil and a second ignition coil provided for the respective said first and second systems;
a stroke determination unit which determines strokes of the respective cylinders;
an ignition map allocation unit which allocates a respective one of said ignition maps to each of said first system and said second system before said stroke determination of respective said cylinders, and which further allocates a respective one of said ignition maps to each of said cylinders after said stroke determination of said cylinders; and
an ignition timing calculation unit which calculates ignition timings for the respective cylinders based on the ignition maps allocated to said cylinders.

2. An engine ignition control apparatus according to claim 1, wherein when the stroke determination is completed before the ignition based on the ignition map is allocated to each of said systems, the ignition map is independently allocated to the respective cylinders only after completion of ignition of one of the systems based on a corresponding one of the ignition maps.

3. An engine ignition control apparatus according to claim 1, further comprising:
a crank pulser rotor operatively associated with a crankshaft of the engine;
a pulse generator for generating pulses based on movement of the crank pulser rotor;
a crank stage setting unit for setting crank stages based on the crank pulses during one rotation of the crankshaft, and
an intake pressure sensor;
and wherein said stroke determination unit determines respective strokes of said cylinders based on said crank pulses and on an output signal received from said intake pressure sensor.

4. An engine ignition control apparatus according to claim 1, further comprising a crank stage setting unit for setting crank stages based on crank pulses before said stroke determination, and an absolute stage setting unit for setting absolute crank stages based on said crank pulses after said stoke determination;
wherein said ignition map allocation unit allocates one of said ignition maps for each of said first system and said second system, respectively, before said stroke determination of respective said cylinders based on said pulses set by said crank stage setting unit;
and wherein said ignition map allocation unit further allocates a respective one of said ignition maps to each of said cylinders after said stroke determination of said cylinders based on said crank pulses set by said absolute stage setting unit.

5. An engine ignition control apparatus according to claim 1, wherein said ignition maps comprise ignition timings for determining when to supply electricity to said first and second ignition coils, respectively; and wherein said ignition timings are calculated based on a rotary engine speed and a throttle opening.

6. An engine ignition control apparatus according to claim 1, wherein before said stroke determination, said ignition map allocation unit allocates the first ignition map to the first system, and the second ignition map to the second system.

7. An engine ignition control apparatus according to claim 1,
wherein said first system comprises a first and a fourth cylinders and the second system comprises a second and a third cylinders;
wherein a maximum lead angle of the fourth ignition map of the fourth cylinder is greater than a maximum lead angle of the first ignition map of the first cylinder; and
wherein a maximum lead angle of the third ignition map of the third cylinder is greater than a maximum lead angle of the second ignition of the second cylinder.

8. A method of controlling ignition of a four cylinder 4-cycle engine using a pair ignition coils, wherein two of the four cylinders having a same operational phase belong to a first system and remaining two cylinders having another same operational phase belong to a second system, and wherein a plurality of ignition maps comprise a first ignition map, a second ignition map, a third ignition map and a fourth ignition map; each of said ignition maps being associated with respective one of said four cylinders;
said method comprising the steps of
determining strokes of respective said cylinders;
before completion of a stroke determination of respective said cylinders, allocating respective one of said ignition maps of said cylinders corresponding to said first system and said second system;
after completion of said stroke determination, independently allocating respective one of said ignition maps of said cylinders; and
calculating ignition timings for respective one of said cylinders based on the ignition maps allocated to said cylinders.

9. A method of controlling ignition according to claim 8, wherein said pair of ignition coils comprises a first ignition coil and a second ignition coil associated with respective said first and second systems.

10. A method of controlling ignition according to claim 8, wherein when the stroke determination is completed before the ignition based on the ignition map allocated to each of said systems, the ignition map is not independently allocated to respective said cylinders until completion of ignition of respective one of said systems based corresponding one of said ignition maps.

11. A method of controlling ignition according to claim 8, wherein the step of, before completion of a stroke determination of respective said cylinders, allocating respective one of said ignition maps of said cylinders corresponding to said first system and said second system comprises allocating the first ignition map to the first system, and the second ignition map to the second system.

12. A method of controlling ignition according to claim 8, wherein said first system comprises a first and a fourth cylinders and the second system comprises a second and a third cylinders of the engine.

13. A method of controlling ignition according to claim 12, wherein a maximum lead angle of the fourth ignition map of the fourth cylinder is greater than a maximum lead angle of the first ignition map of the first cylinder; and wherein a maximum lead angle of the third ignition map of the third cylinder is greater than a maximum lead angle of the second ignition of the second cylinder.

14. A method of controlling ignition according to claim 8, wherein said ignition maps comprise ignition timings for starting supply of electricity to said first and second ignition coils; and wherein said ignition timing are calculated based on a rotary engine speed and a throttle opening.

15. A method of controlling ignition of a four cylinder 4-cycle engine using a pair ignition coils, wherein two of the four cylinders have a same operational phase belong to a first system and a remaining two cylinders have another same operational phase belong to a second system, and wherein a plurality of ignition maps comprises a first ignition map, a second ignition map, a third ignition map and a fourth ignition map; each of said ignition maps being associated with a respective one of said four cylinders;
said method comprising the steps of
before completion of a stroke determination of each of said cylinders, based on a status of a crank stage, allocating one of said first ignition map to said first system and said second ignition map to said second system;
determining strokes each of said cylinders;
after completion of said stroke determination, independently allocating a respective one of said ignition maps to each of said cylinders; and
calculating ignition timings for said cylinders based on the ignition maps allocated to said cylinders.

16. A method of controlling ignition according to claim 15, wherein said pair of ignition coils comprises a first ignition coil and a second ignition coil associated with respective said first and second systems.

17. A method of controlling ignition according to claim 15, wherein when the stroke determination is completed before the ignition based on respective one of the ignition maps allocated to each of said systems, the ignition maps are not independently allocated to respective said cylinders until completion of the system ignition based on said respective one of said ignition maps.

18. A method of controlling ignition according to claim 15, wherein said first system comprises a first and a fourth cylinders and the second system comprises a second and a third cylinders.

19. A method of controlling ignition according to claim 18, wherein a maximum lead angle of the fourth ignition map of the fourth cylinder is greater than a maximum lead angle of the first ignition map of the first cylinder; and wherein a maximum lead angle of the third ignition map of the third cylinder is greater than a maximum lead angle of the second ignition of the second cylinder.

20. A method of controlling ignition according to claim 8, wherein said ignition maps comprise ignition timings for starting supply of electricity to said first and second ignition coils; and wherein said ignition timing are calculated based on a rotary engine speed and a throttle opening.

* * * * *